US012650946B1

(12) United States Patent
Gibson

(10) Patent No.: US 12,650,946 B1
(45) Date of Patent: Jun. 9, 2026

(54) APPARATUS AND METHOD FOR GENERATING AT LEAST A DATA CONNECTOR

(71) Applicant: Hurree Labs, Inc., Boca Raton, FL (US)

(72) Inventor: Aaron Gibson, Belfast (IE)

(73) Assignee: Hurree Labs, Inc., Boca Raton, FL (US)

( * ) Notice: Subject to any disclaimer, the term of this patent is extended or adjusted under 35 U.S.C. 154(b) by 0 days.

(21) Appl. No.: 19/300,111

(22) Filed: Aug. 14, 2025

(51) Int. Cl.
*G06F 13/40* (2006.01)

(52) U.S. Cl.
CPC ...... *G06F 13/4068* (2013.01); *G06F 2213/40* (2013.01)

(58) Field of Classification Search
CPC ......................... G06F 13/4068; G06F 2213/40
See application file for complete search history.

(56) References Cited

U.S. PATENT DOCUMENTS

2018/0027063 A1 * 1/2018 Nachimuthu ......... G08C 17/02
2020/0004710 A1 1/2020 Peter et al.

2021/0005307 A1 * 1/2021 Knoplioch ............. G16H 10/60
2021/0406899 A1 12/2021 Dwivedi et al.
2022/0012045 A1 * 1/2022 Rudraraju ................. G06F 8/36
2022/0286462 A1 * 9/2022 Brannon ............... G06F 21/604
2023/0222020 A1 7/2023 Ahmed et al.
2024/0378390 A1 11/2024 Korganyan et al.

* cited by examiner

*Primary Examiner* — Henry Tsai
*Assistant Examiner* — Aurangzeb Hassan
(74) *Attorney, Agent, or Firm* — CALDWELL LLC

(57) ABSTRACT

An apparatus and method for generating at least a data connector. The apparatus includes at least a processor and a memory communicatively connected to the at least a processor. The memory instructs the processor to receive input data from an external source, wherein the input data comprises a plurality of source parameters, identify a first data schema associated with the external source and a second data schema associated with an internal system, instantiate a runtime instance of a data connector associated with the external source as a function of the first data schema and the second data schema, configure the data connector by binding the data connector to a web service protocol, registering the data connector to the internal system, and validating the data connector using at least a compliance protocol, and deploy the data connector to a service-based orchestration layer of the internal system.

18 Claims, 8 Drawing Sheets

Machine-Learning Module 300

Dedicated Hardware Unit 336

Unsupervised Machine-Learning Process 332

Supervised Machine-Learning Process 328

Machine-Learning Model 324

Lazy Learning Process 320

Training Data 304

Training Data Classifier 316

Input 312

Output 308

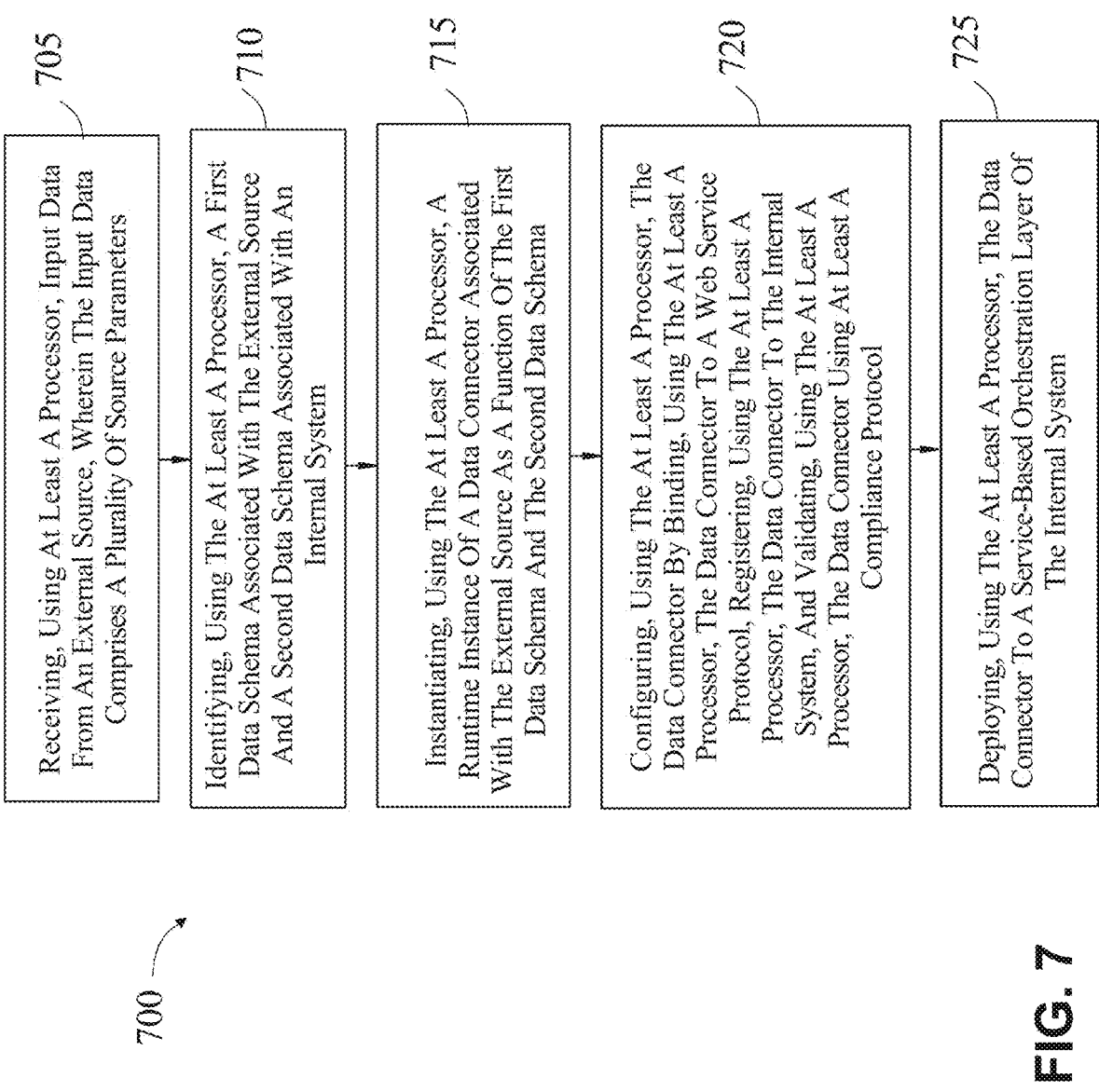

705

Receiving, Using At Least A Processor, Input Data From An External Source, Wherein The Input Data Comprises A Plurality Of Source Parameters

710

Identifying, Using The At Least A Processor, A First Data Schema Associated With The External Source And A Second Data Schema Associated With An Internal System

715

Instantiating, Using The At Least A Processor, A Runtime Instance Of A Data Connector Associated With The External Source As A Function Of The First Data Schema And The Second Data Schema

720

Configuring, Using The At Least A Processor, The Data Connector By Binding, Using The At Least A Processor, The Data Connector To A Web Service Protocol, Registering, Using The At Least A Processor, The Data Connector To The Internal System, And Validating, Using The At Least A Processor, The Data Connector Using At Least A Compliance Protocol

725

Deploying, Using The At Least A Processor, The Data Connector To A Service-Based Orchestration Layer Of The Internal System

APPARATUS AND METHOD FOR GENERATING AT LEAST A DATA CONNECTOR

FIELD OF THE INVENTION

The present invention generally relates to the field of data integration. In particular, the present invention is directed to an apparatus and a method for generating at least a data connector.

BACKGROUND

External systems frequently rely on incompatible data schemas, authentication methods, or communication protocols, requiring custom logic to align them. Manual connector setup is error-prone due to inconsistent metadata formats, unclear data mappings, and the need for manual configuration of endpoints and transformation rules. These technical mismatches often lead to integration failures, delays, and increased maintenance overhead.

SUMMARY OF THE DISCLOSURE

In an aspect, an apparatus for generating at least a data connector includes at least a processor and a memory communicatively connected to the at least a processor. The memory contains instructions configuring the processor to receive input data from an external source, wherein the input data comprises a plurality of source parameters, identify, using the at least a processor, a first data schema associated with the external source and a second data schema associated with an internal system, instantiate, using the at least a processor, a runtime instance of a data connector associated with the external source as a function of the first data schema and the second data schema, configure, using the at least a processor, the data connector by binding, using the at least a processor, the data connector to a web service protocol, registering, using the at least a processor, the data connector to the internal system, and validating, using the at least a processor, the data connector using at least a compliance protocol, and deploy, using the at least a processor, the data connector to a service-based orchestration layer of the internal system.

In another aspect, a method for generating at least a data connector includes receiving, using at least a processor, input data from an external source, wherein the input data comprises a plurality of source parameters, identifying, using the at least a processor, a first data schema associated with the external source and a second data schema associated with an internal system, instantiating, using the at least a processor, a runtime instance of a data connector associated with the external source as a function of the first data schema and the second data schema, configuring, using the at least a processor, the data connector by binding, using the at least a processor, the data connector to a web service protocol, registering, using the at least a processor, the data connector to the internal system, and validating, using the at least a processor, the data connector using at least a compliance protocol, and deploying, using the at least a processor, the data connector to a service-based orchestration layer of the internal system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a block diagram of an exemplary method for generating at least a data connector.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating at least a data connector. The apparatus includes at least a computing device comprised of a processor and a memory communicatively connected to the processor. The memory instructs the processor to receive input data from an external source, wherein the input data comprises a plurality of source parameters. The processor identifies a first data schema associated with the external source and a second data schema associated with an internal system. The processor instantiates a runtime instance of a data connector associated with the external source as a function of the first data schema and the second data schema. Additionally, the processor configures the data connector by binding, using the at least a processor, the data connector to a web service protocol, registering, using the at least a processor, the data connector to the internal system, and validating, using the at least a processor, the data connector using at least a compliance protocol. The processor deploys the data connector to a service-based orchestration layer of the internal system.

Figure 1:
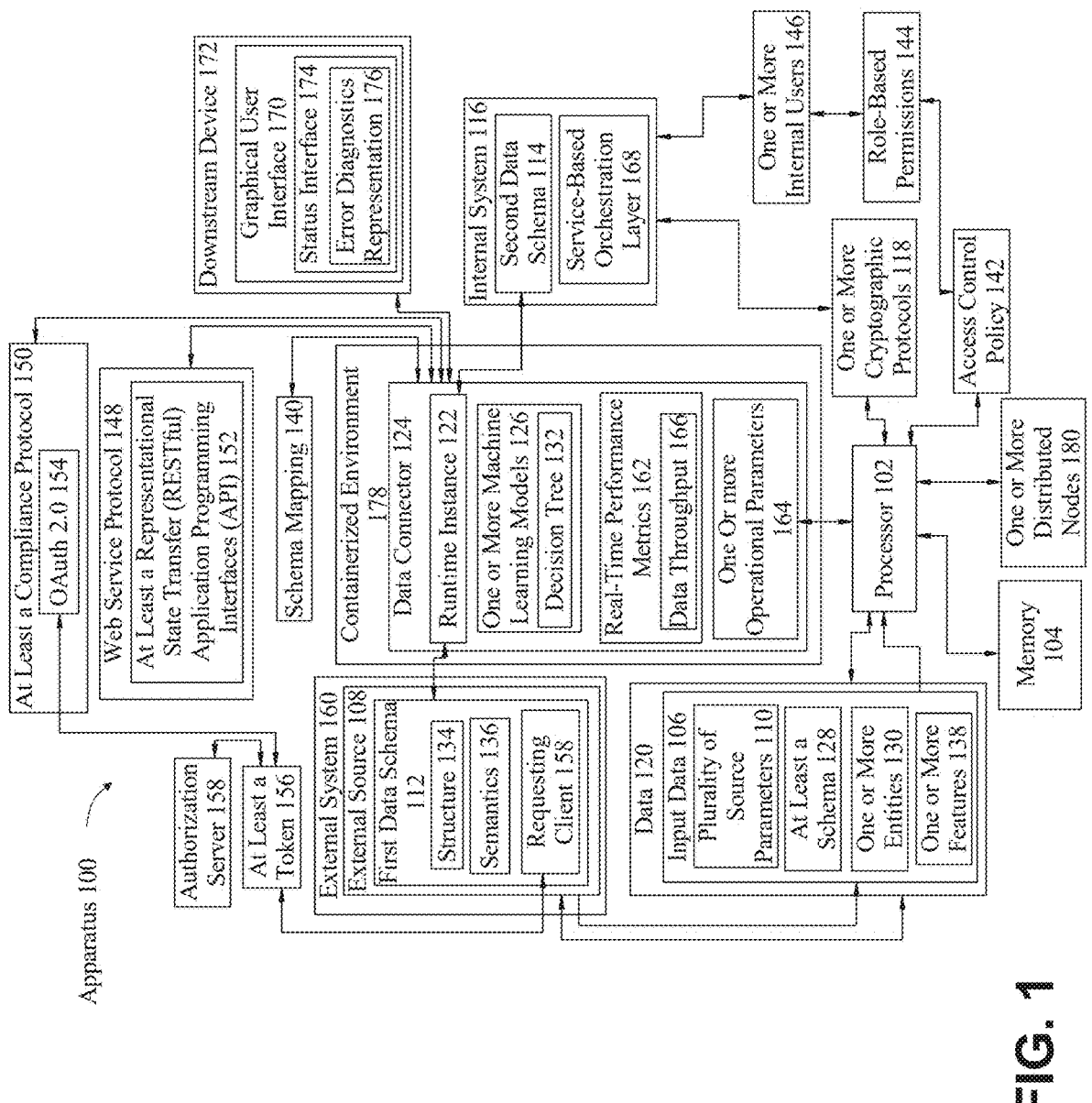
FIG. 1 is a block diagram of an apparatus for generating at least a data connector.

Referring now to FIG. 1, an exemplary embodiment of apparatus 100 for generating at least a data connector is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive input data 106 from an external source 108, wherein the input data 106 comprises a plurality of source parameters 110. As used in this disclosure, "input data" is information received by a system or component for processing. Without limitation, the input data 106 may include information that originates from one or more sources and is formatted to enable a computational operation, transformation, or response. Without limitation, input data 106 may include structured, semi-structured, or unstructured digital content transmitted from an external source 108 for the purpose of integration, transformation, and analysis within a business intelligence framework. In an embodiment, the input data 106 may be received via web service protocols such as RESTful APIs or GraphQL endpoints and ingested by the apparatus 100 using a data connector 124 configured with embedded artificial intelligence. The input data 106 may be parsed and interpreted by machine learning models, such as decision trees or neural network classifiers, that enable schema detection, entity recognition, and semantic alignment, as discussed in further detail herein. More specifically, the input data 106 may include structured datasets exported from a customer relationship management platform, wherein each record includes fields such as contact name, lead score, and last interaction date. The input data 106 may include session-level analytics retrieved from a web tracking service, including page view durations, bounce rates, and conversion funnels formatted in nested JSON. In another example, the input data 106 may include sales opportunity objects from a revenue operations platform, which contain nested hierarchies of accounts, opportunities, and deal stages, along with timestamps formatted in ISO 8601, numeric confidence values, and status enumerations. Without limitation, the diverse formats and schemas may be automatically reconciled by the AI model of the connector and thereby may enable consistent labeling and alignment with internal data models used for real-time reporting, predictive modeling, and cross-platform interoperability.

With continued reference to FIG. 1, as used in this disclosure, "external source" is a system, device, platform, or interface that exists outside of the apparatus 100 or computing environment. In an embodiment, the external source 108 may be operable to provide information, signals, or data for further processing to the apparatus 100. Without limitation, an external source 108 may include a third-party data system that provides structured or semi-structured information for consumption by an integration tool. In an embodiment, the external source 108 may be a cloud-based enterprise service that exposes customer, marketing, or sales data via a secure API. More specifically, the external source 108 may be a customer relationship management platform such as Salesforce, a web analytics service such as Google Analytics, or a marketing automation system such as HubSpot, each transmitting real-time campaign metrics, lead activity logs, or revenue attribution data to the AI-enhanced connector.

With continued reference to FIG. 1, as used in this disclosure, "source parameters" are values, attributes, or descriptors associated with or originating from a source, wherein such parameters characterize, identify, or define the structure, content, behavior, or context of the data 120 provided by the source. Without limitation, source parameters 110 may include distinguishing characteristics or metadata that define the structural, contextual, or operational aspects of the input data 106. In an embodiment, the source parameters 110 may be used by the system's AI module to guide schema inference, establish entity relationships, or apply labeling logic. More specifically, source parameters 110 may include a campaign identifier indicating a digital marketing initiative, a lead status label reflecting sales engagement, or a timestamp format used to segment event-level behavior, all of which inform how the connector aligns incoming data streams with internal dashboards or forecasting tools in a business intelligence system.

Still referring to FIG. 1, processor 102 is configured to identify a first data schema 112 associated with the external source 108 and a second data schema 114 associated with an internal system 116. As used in this disclosure, "data schema" is a structural framework or definitional blueprint that specifies the organization, format, and semantic meaning of data elements. A data schema may define field names, data types, hierarchical relationships, or validation rules used to parse, align, and interpret data within or between systems.

As used in this disclosure, "internal system" is a computing environment, platform, or application framework residing within the operational or administrative control of the apparatus 100. The internal system 116 may be responsible for processing, storing, transforming, or displaying data in accordance with internal logic, policies, or business objectives.

With continued reference to FIG. 1, the at least a processor 102 may be further configured to encrypt, using one or more cryptographic protocols 118, data 120 transmitted between the internal system 116 and the external source 108. As used in this disclosure, "data" is information that is represented in a form suitable for processing, transmission, or storage by a computing system. The data 120 may include the input data 106. The data 120 may include textual, numerical, symbolic, binary, or encoded content derived from digital or analog sources and may be structured or unstructured depending on the application. As used in this disclosure, "cryptographic protocols" are computational procedures that enable secure communication. In an embodiment, the cryptographic protocols 118 may enable secure communication by transforming data into a protected format that is unreadable or unusable without the proper decryption mechanism or authentication credentials. The cryptographic protocols 118 may ensure confidentiality by restricting data visibility to authorized entities 130, integrity by detecting unauthorized modifications to transmitted content, authenticity by verifying the identity of the sender or recipient, and non-repudiation by providing cryptographic proof that a particular entity was involved in a transaction or communication. Without limitation, the cryptographic protocols 118 may include symmetric or asymmetric encryption schemes, message authentication codes, digital signatures, or secure key exchange mechanisms. In an embodiment, the cryptographic protocols 118 may be employed during data transmission between the internal system 116 and the external source 108 to prevent interception, tampering, or unauthorized access, thereby supporting secure interoperability across distributed systems, cloud services, and third-party data platforms.

Without continued reference to FIG. 1, cryptographic protocols 118 may include Transport Layer Security (TLS), Secure Shell (SSH), Hypertext Transfer Protocol Secure (HTTPS), and the like. As used in this disclosure, "Transport Layer Security (TLS)" is a cryptographic protocol that establishes a secure channel over a computer network by encrypting communications between two endpoints, thereby protecting the confidentiality and integrity of the data 120 exchanged. Without limitation, TLS may be used to encrypt traffic between a web browser and a server during an online banking session. In an embodiment, the TLS handshake may involve asymmetric cryptography to exchange keys, followed by symmetric encryption using algorithms such as Advanced Encryption Standard (AES). In an embodiment, the cryptographic protocols 118 may also include protocols based on public-key infrastructure such as Pretty Good Privacy (PGP) for securing email content, or IPsec for encrypting data packets at the network layer. Additionally, cryptographic protocols 118 such as JSON Web Token (JWT) may be used to securely transmit claims between parties in a digitally signed format, ensuring data authenticity and access control in API-based environments. As used in this disclosure, "Secure Shell (SSH)" is a cryptographic protocol that enables secure remote access to a computing device or server by encrypting command-line interactions and file transfers between systems over unsecured networks. Without limitation, SSH may be used by a system administrator to securely log into a remote server and execute diagnostic commands. In an embodiment, SSH may utilize Rivest-Shamir-Adleman (RSA) or Elliptic Curve Digital Signature Algorithm (ECDSA) for key exchange and AES for session encryption. As used in this disclosure, "Hypertext Transfer Protocol Secure (HTTPS)" is a network communication protocol that combines HTTP with encryption provided by TLS to secure the transmission of web content between a client and a server. Without limitation, HTTPS may be used when a customer submits credit card information on an e-commerce site. In an embodiment, HTTPS may rely on X.509 Public Key Infrastructure (X.509) digital certificates to authenticate the server's identity before initiating a TLS handshake. As used in this disclosure, "Pretty Good Privacy (PGP)" is a cryptographic protocol that uses a combination of symmetric and asymmetric encryption to secure the contents of electronic communications and to verify sender authenticity through digital signatures. Without limitation, PGP may be used to encrypt and sign a confidential project update shared between business partners over email. In an embodiment, PGP may generate a one-time symmetric key for encrypting the message, then encrypts the symmetric key with the recipient's public key. As used in this disclosure, "Internet Protocol Security (IPsec)" is a suite of cryptographic protocols 118 that secures communication over IP networks by encrypting and authenticating IP packets. In an embodiment, the IPsec may be used in virtual private networks or other protected network configurations. Without limitation, IPsec may be used by a remote employee accessing a corporate network through a Virtual Private Network (VPN) client. In an embodiment, IPsec may use Encapsulating Security Payload (ESP) to encrypt packet contents and Authentication Header (AH) to verify packet integrity. As used in this disclosure, "JSON Web Token (JWT)" is a compact, digitally signed cryptographic protocol used to securely transmit information between systems as a JSON object, wherein the token contains claims that may be verified and trusted through signature validation. Without limitation, JWT may be used to transmit user identity and access rights in an authorization header during Application Programming Interface (API) calls between a frontend application and a backend service. In an embodiment, JWT may consist of three parts: header, payload, and signature, each base64-encoded and concatenated with periods to form a compact string representation. The header may include metadata describing the algorithm used for signing the token, such as HMAC with Secure Hash Algorithm 256 (HMAC-SHA-256) or RSA with SHA-256. The payload may include a set of claims, which are statements about an entity (such as a user, device, or service) and may further include token metadata such as expiration time, issuer identity, and intended audience. The signature may be generated by applying the specified signing algorithm to the concatenated base64-encoded header and payload, using a shared secret (in the case of HMAC) or a private key (in the case of RSA). Secure Hash Algorithm 256 (SHA-256) is a cryptographic hash function that produces a 256-bit fixed-length output and is used within the signing algorithm to ensure that any alteration to the token is detectable. The resulting JWT structure allows recipients to verify the token's authenticity and integrity without relying on persistent server-side session storage.

With continued reference to FIG. 1, in an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities 130 that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, token may include a time-varying token, which may have a time limit after which time-varying token is no longer valid. Time limit may be calculated from an initial time, which may be a datum linked to a particular timestamp or other value representing a fixed moment in time, associated with time-varying token; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

With continued reference to FIG. 1, token may include performing a trusted time evaluation of the token by the computing device. As a non-limiting example, secure proof may be generated using a secure timestamp. Generating the secure timestamp may include digitally signing the secure timestamp using any digital signature protocol as described above. In one embodiment authenticity of received data signals is established by utilizing a chain of attestation via one or more attestation schemes (in nonlimiting example, via direct anonymous attestation (DAA)) to verify that a token is an authentic token that has the property of attested time. Generating a secure timestamp may be used to weed out spoofers or "man in the middle attacks."

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using token. Additional data may include one or more additional data, including input data 106, that is received by processor 102. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. [data], along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, an authentication server or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

With continued reference to FIG. 1, in a non-limiting example, data processing described herein may be consistent with one or more aspects of the data 120 processing as described in U.S. patent application Ser. No. 19/299,981, filed on Aug. 14, 2025, titled "Apparatus And Method For Generating Normalized Outputs As A Function Of Processed Heterogeneous Data And At Least A Transformation Process," which is incorporated by reference herein in its entirety.

Still referring to FIG. 1, processor 102 is configured to instantiate a runtime instance 122 of a data connector 124 associated with the external source 108 as a function of the first data schema 112 and the second data schema 114. As used in this disclosure, "runtime instance" is an operational representation of a software component. The runtime instance 122 may be generated, configured, and executed during system operation, rather than precompiled or statically defined prior to execution. The runtime instance 122 may include all necessary state, configuration parameters, and execution logic required for active functionality in a dynamic computing environment. In an embodiment, the runtime instance 122 may be instantiated by a processor 102 in response to contextual data inputs, and may support real-time interaction, resource allocation, and task-specific execution within a live system or containerized deployment. Without limitation, the runtime instance 122 may include an in-memory process that is created when a system receives input data 106 from an external source 108 and triggers schema matching logic. In an embodiment, the runtime instance 122 may be a containerized microservice launched on a Kubernetes node, dynamically provisioned based on workload demand, and executing a configured data connector 124 with access tokens, field mappings, and compliance policies loaded into active memory. In an embodiment, the runtime instance 122 may include a Node.js service instantiated through a serverless function such as AWS Lambda, where the service pulls a schema definition from a configuration database, connects to a RESTful API endpoint, and performs field normalization and validation in real time. In another embodiment, the runtime instance 122 may include a Java-based Spring Boot application spun up by a service orchestration layer, where the application hosts a data transformation pipeline that maps lead information from a CRM platform into internal marketing analytics structures.

With continued reference to FIG. 1, as used in this disclosure, "data connector" is a software construct that facilitates the transfer, transformation, or synchronization of data between an external source 108 and an internal system 116. The data connector 124 may define connection protocols, authentication mechanisms, data mapping logic, and schema translation routines that enable interoperability across heterogeneous systems. In an embodiment, the data connector 124 may support bi-directional communication, and may be implemented using standardized interface protocols such as RESTful APIs or GraphQL, enabling the integration of third-party platforms, services, or databases with internal workflows. Without limitation, the data connector 124 may include platform-specific connectors, protocol-based connectors, and semantic connectors that support integration across heterogeneous data systems. As used in this disclosure, "platform-specific connectors" are data connectors that are purpose-built to integrate with a particular software platform, application, or service. In an embodiment, the platform-specific connectors may integrate by leveraging that platform's published APIs, authentication protocols, and data structures. In an embodiment, a platform-specific connector may encapsulate the required logic to authenticate, extract, transform, and transmit data to and from a named external service, such as Salesforce, HubSpot, or Google Analytics. Without limitation, the platform-specific connector may be configured to align proprietary field names and data formats with internal schemas to ensure compatibility and interoperability within the system. As used in this disclosure, "protocol-based connectors" are data connectors that facilitate integration by adhering to a particular communication protocol or data exchange standard, rather than targeting a specific platform. In an embodiment, a protocol-based connector may be designed to interact with systems using standard interfaces such as RESTful APIs, GraphQL, SOAP, FTP, or JDBC, allowing generalized data access across multiple platforms that conform to the same protocol. Without limitation, the protocol-based connector may be dynamically configured to issue requests, parse responses, and apply transformation logic based on schema definitions received during runtime. As used in this disclosure, "semantic connectors" are data connectors that perform data integration by interpreting and reconciling the semantic meaning of data fields across different schemas, rather than relying solely on field names or fixed mappings. In an embodiment, a semantic connector may utilize artificial intelligence, schema inference models, or entity recognition techniques to determine how conceptually similar but structurally different data elements correspond across systems. Without limitation, a semantic connector may identify that an external field labeled "cust_email" represents the same entity as an internal field labeled "primary_contact_e-mail" and align the two for coherent data ingestion and analysis.

With continuation to FIG. 1, in an embodiment, the data connector 124 may be a Salesforce connector configured to retrieve lead, account, and opportunity data through the Salesforce REST API and align the retrieved fields with internal CRM schema definitions. In an embodiment, the data connector 124 may include a Google Analytics connector, which uses OAuth 2.0 154 for authentication and extracts traffic metrics, session data, and user behavior patterns through the Google Analytics Reporting API, then transforms the output into normalized structures suitable for internal dashboards. In another embodiment, the data connector 124 may include a webhook-based connector that is instantiated to receive real-time event notifications from an external platform, such as a marketing automation service, and automatically ingest those events into a time-series database after converting timestamps and field types. A SQL-based connector may be used to interface with relational databases, executing parameterized queries to pull records, then applying schema mapping logic to translate relational table structures into internal object models. In an embodiment, the data connector 124 may include a GraphQL-based connector may query a flexible, schema-driven API to fetch nested objects, such as campaign data with associated performance metrics, and resolve the returned hierarchical structure into a flattened format compatible with internal analytics tools. These data connector 124 may be instantiated at runtime by the processor 102 based on schema compatibility, protocol configuration, and authentication requirements.

With continued reference to FIG. 1, in an embodiment, the data connector 124 may include a hybrid data connector 124. As used in this disclosure, "hybrid connector" is a data connector 124 that combine features of both platform-specific and protocol-based or semantic connectors. In an embodiment, the hybrid connector may enable flexible, adaptive integration across varied systems. In an embodiment, a hybrid connector may be pre-configured to interact with a known platform using its proprietary APIs while also supporting dynamic schema mapping or semantic alignment to accommodate changes in data structure or integration context. Without limitation, the hybrid connector may connect to a cloud-based CRM using its RESTful API while simultaneously applying machine learning-based schema inference to match external field names with internal models, thereby facilitating both deterministic and adaptive data translation within a single runtime instance 122.

With continued reference to FIG. 1, in an embodiment, the processor 102 may analyze the first data schema 112, which defines the structure 134 and semantics 136 of data provided by the external source 108, and compare it to the second data schema 114, which represents the expected structure of data within the internal system 116. Without limitation, and based on this analysis, the processor 102 may generate a runtime configuration that includes schema alignment logic, field mapping rules, and transformation routines required to reconcile structural and semantic differences between the two schemas. As used in this disclosure, "schema alignment logic" is a set of computational operations that determine how data elements from one schema correspond to those in another schema. In an embodiment, the schema alignment logic may be based on structure, type, and contextual meaning. In an embodiment, schema alignment logic may analyze field hierarchies, naming conventions, and data types to identify compatibility between external and internal schema elements. Without limitation, the schema alignment logic may support partial matches, hierarchical flattening, or semantic equivalency detection to establish structural coherence between heterogeneous data representations. As used in this disclosure, "field mapping rules" are predefined or dynamically generated associations that specify how individual fields from a source schema are to be linked, renamed, or redirected to corresponding fields in a target schema. In an embodiment, field mapping rules may include logic for direct one-to-one mappings, one-to-many expansions, or conditional transformations based on metadata or business logic. Without limitation, field mapping rules may include directives such as mapping an external field labeled "cust_id" to an internal field labeled "customer_identifier," ensuring consistent labeling and data integrity throughout the system. As used in this disclosure, "transformation routines" are executable procedures that modify, normalize, or restructure data values during transmission or ingestion in order to reconcile differences between a source schema and a target schema. In an embodiment, transformation routines may include operations such as type casting, format conversion, unit standardization, or the enrichment of data through rule-based or AI-driven augmentation. Without limitation, a transformation routine may convert a timestamp from a UNIX epoch format to an ISO 8601 string, or split a full name field into separate first and last name fields in accordance with internal data handling requirements.

With continued reference to FIG. 1, in an embodiment, the instantiation of the runtime instance 122 may include allocating memory, loading schema-specific modules, and dynamically generating execution instructions that enable the data connector 124 to accept, transform, and transmit data in real time. In an embodiment, the processor 102 may configure the data connector 124 to map source fields such as contact Name to internal fields such as full_name, convert date formats, or normalize categorical values. The resulting runtime instance 122 may be deployed within a containerized environment 178 or a service-based orchestration layer 168, enabling schema-specific execution without requiring static or precompiled logic.

With continued reference to FIG. 1, the at least a processor 102 may be further configured to instantiate one or more machine learning models 126 associated with the data connector 124, wherein the one or more machine learning models 126 are configured to detect at least a schema 128 of the input data 106 and identify one or more entities 130 of the input data 106. As used in this disclosure, an "entity" is information within a dataset that represents a discrete object, concept, or data unit. In an embodiment, the entity may represent a discrete object, concept, or data unit relevant to a defined context, such as a person, location, organization, event, numerical value, or category. Without limitation, examples of entities 130 may include a PATIENT NAME in healthcare data, a TRANSACTION AMOUNT in financial records, a DEVICE TYPE in IoT telemetry streams, as well as identifiers such as the NAME OF A COMPANY, the NAME OF A PLATFORM, or the NAME OF AN EXTERNAL SYSTEM that provided or originated the input data 106. For example, without limitation, the machine learning model may identify the entity "SALESFORCE" as a platform source, "ACME CORP" as the customer organization, or "AWS" as the infrastructure origin. In an embodiment, these entities 130 may be extracted to determine the data lineage, apply source-specific transformation rules, or assign access policies based on system-level trust classifications.

With continued reference to FIG. 1, in an embodiment, the one or more machine learning models 126 may include a neural network model, such as a transformer-based model or a recurrent neural network (RNN), configured for natural language understanding or structured data classification. The one or more machine learning models 126 may be trained to detect underlying patterns in diverse input data 106 formats, enabling the system to infer schema structures even when metadata or labeling is absent or inconsistent. Without limitation, the machine learning models may improve the system by enabling adaptive schema recognition across disparate data sources, facilitating automated normalization, transformation, or reconciliation processes. The one or more machine learning models 126 may be trained on labeled datasets comprising known data schemas and annotated entities 130 from structured formats such as CSV, XML, JSON, or from semi-structured sources such as log files, electronic forms, or tabular reports. In an embodiment, training data may include domain-specific examples such as historical health records, inventory databases, or CRM exports. In an embodiment, the schema detection component of the one or more machine learning models 126 may learn to identify fields such as DATE OF SERVICE, CLIENT ADDRESS, or PRODUCT CATEGORY, while the entity recognition component may extract specific values, e.g., "12/06/2025", "123 MAIN ST", or "VITAMIN SUPPLE-MENTS", respectively. The one or more machine learning models 126 may be continuously retrained or fine-tuned based on incoming data to enhance domain specificity and maintain accuracy in evolving environments. Additionally and/or alternatively, the apparatus 100 may employ ensemble learning techniques or transfer learning, allowing pre-trained models to be customized for specific data connector 124 configurations or enterprise data standards, thereby reducing manual configuration steps and improving integration efficiency. The one or more machine learning models 126 may be the same or similar to the models described in FIG. 3.

With continued reference to FIG. 1, the at least a processor 102 may be further configured to determine, using a decision tree 132 of the one or more machine learning models 126, a structure 134 and associated semantics 136 of the first data schema 112 by identifying one or more features 138 of the input data 106 and generate, using the at least a processor 102, a schema mapping 140 between the first data schema 112 and the second data schema 114 of the internal system 116 based on the structure 134 and the associated semantics 136. As used in this disclosure, a "decision tree" is a machine learning model comprising a set of condition-ally branched rules arranged in a tree-like hierarchy, wherein each internal node represents a decision rule based on an input feature, each branch represents an outcome of the rule, and each leaf node represents an output classification or regression value. Without limitation, a decision tree 132 may be trained to classify field types, infer field relationships, or associate semantic labels with data elements. The decision tree 132 may include one or more of a variety of types, including a classification decision tree 132, a regression decision tree 132, a chi-squared automatic interaction detec-tor tree, an iterative dichotomiser tree, a random forest-based decision tree 132, an oblique decision tree 132, a fuzzy decision tree 132, a cost-sensitive decision tree 132, a hybrid decision tree 132 model combining multiple decision criteria or structural adaptations, and the like.

With continued reference to FIG. 1, as used in this disclosure, a "structure" is information that defines the organizational arrangement or layout of the data schema. For example, without limitation, the structure 134 may include field ordering, data types, nesting of records, the presence of hierarchical elements, and the like. Without limitation, struc-ture may refer to a flat table format with fields such as NAME, DOB, and AMOUNT, or a nested format such as JSON with objects containing arrays and sub-fields. As used in this disclosure, "semantics" is information that defines the contextual meaning or interpretation of one or more data elements, beyond their structural representation. Without limitation, semantics 136 may involve determining that a field labeled "ID" refers to a PATIENT IDENTIFIER, or that a numeric value formatted as "12.99" in a PRICE column represents MONETARY VALUE in USD. As used in this disclosure, "features" are measurable characteristics derived from the input data 106, used by machine learning models for analysis, classification, or prediction. Without limitation, features 138 may include the name of the column, data type such as string, integer, datetime, frequency of occurrence of values, statistical distribution, contextual metadata such as field labels or inferred usage, and the like. As used in this disclosure, "schema mapping" is information that defines a correspondence between two distinct data schemas, enabling transformation or alignment of data from one schema into another. Without limitation, schema mapping 140 may involve converting a field labeled "FULL_NAME" in an external schema into a field labeled "PATIENT NAME" in the internal schema, including any necessary formatting, semantic conversion, data normalization operations, and the like. In an embodiment, the decision tree 132 may use features 138 such as column headers, example values, data frequency, or type information to infer both the structure 134 such as identifying fields and their arrangement and seman-tics 136 like understanding the business meaning of each field of the first data schema 112. Without limitation, based on this analysis, the apparatus 100 may generate a schema mapping 140 that transforms the input data 106 into a standardized form consumable by the internal system 116. Without limitation, in an embodiment, the input data 106 may include business intelligence (BI) data exported from a third-party analytics platform such as Tableau or Power BI. Continuing, the input data 106 may include a structured table with columns labeled "Cust_ID", "Trans_Date", "Rev_USD", and "Region_Code". The at least a processor 102 may instantiate a decision tree 132 model trained to interpret BI data exports. The decision tree 132 may analyze the input features 138 of each column, including header names, such as "Cust_ID", data types like string or date, value formats such as ISO 8601 dates, and statistical patterns like revenue amounts with decimal values. The one or more machine learning models 126 may determine that the struc-ture 134 includes four fields, with a flat schema consisting of primitive data types like strings, floats, and timestamps and no nested objects. Continuing, based on learned rules, the decision tree 132 may further determine the semantics 136 of the data 120: for example, it may infer that "Cust_ID" corresponds to a CUSTOMER IDENTIFIER, "Trans_Date" to a TRANSACTION TIMESTAMP, "Rev_USD" to a MONETARY VALUE expressed in U.S. dollars, and "Region_Code" to a GEOGRAPHIC REGION CLASSI-FIER. Without limitation, the semantic assignments may be guided by prior training on annotated BI datasets containing similar field labels and usage patterns. The processor 102 may then generate a schema mapping 140 that aligns the first data schema 112 like the BI export to the second data schema 114 of the internal system 116, where the standard-ized field labels are "CUSTOMER NAME," "DATE OF TRANSACTION," "REVENUE," and "REGION." As part of the mapping, the processor 102 may apply transformations such as renaming "Rev_USD" to "REVENUE" and converting region codes like "NE" or "SE" into full region names such as "NORTHEAST" or "SOUTHEAST."

With continued reference to FIG. 1, the at least a processor 102 may be further configured to generate an access control policy 142 for the data connector 124 based on role-based permissions 144 of one or more internal users 146. As used in this disclosure, an "access control policy" is information that defines the rules, constraints, or conditions under which a user, process, or system is permitted to access, modify, or interact with a resource. In an embodiment, the resource may include a dataset, interface, or processing function. Without limitation, the access control policy 142 may specify allowable actions such as read, write, edit, delete, or execute, and may be used to enforce data security, compliance, or operational control across internal systems 116.

With continued reference to FIG. 1, as used in this disclosure, "role-based permissions" are information that assign access rights and privileges to users based on defined roles or job functions within an organization. Without limitation, each role may be associated with a predefined set of permissions that determine which data resources the role may access and what operations the role may perform. Without limitation, examples of role-based permissions 144 may include allowing a data analyst to view and filter data, allowing an administrator to configure or delete a data connector 124, or allowing an auditor to access historical logs but not modify data content. As used in this disclosure, "internal users" are individuals authorized to operate within the internal environment of an organization or enterprise system. Without limitation, the internal users 146 may include employees, contractors, consultants, or system agents who are provisioned with credentials and are permitted to access internal tools, dashboards, data sources, or administrative functions. In an embodiment, the internal users 146 may be authenticated using an identity management system and mapped to specific roles that determine their access within the data integration system.

With continued reference to FIG. 1, in an embodiment, the access control policy 142 may be generated based on predefined role-to-permission mappings associated with internal users 146 stored in a configuration data structure. For example, without limitation, a system administrator may be assigned a role titled "ADMINISTRATOR" which is associated with full access rights. These rights may include the ability to create new data connectors, delete existing connectors, edit schema mappings 140, configure data validation settings, and assign user permissions. The processor 102 may evaluate this role and automatically provision access to all administrative interfaces within the system dashboard, including those used to manage connector authentication credentials, scheduling parameters, and transformation logic. In contrast, an internal user assigned the role titled "ANALYST" may only be granted read-only permissions. The access control policy 142 generated for this role may permit viewing of data flow metrics, schema visualizations, and summary reports through a restricted portion of the user interface. The analyst may be permitted to filter and export data but may be explicitly denied permission to modify schema mappings 140, reconfigure connector settings, or change authentication credentials. The processor 102 may enforce these constraints by disabling or concealing certain interface elements or returning a permission-denied response when a restricted action is attempted. Additionally and/or alternatively, a third internal user may be assigned the role titled "AUDITOR." The "AUDITOR" role may be configured to allow access to immutable logs of data access events, system alerts, and schema changes, while denying access to live data or connector configuration tools. The access control policy 142 generated for the "AUDITOR" role may thus enable accountability and oversight without exposing sensitive data or system control functions. Without limitation, the processor 102 may dynamically generate and enforce access control policies that reflect organizational policies and ensure that internal users 146 interact with the data connector 124 in a manner consistent with their designated responsibilities. The processor 102 may access a role-permission mapping stored in memory or in a centralized configuration service, retrieve the role assigned to each authenticated internal user, and generate a corresponding access control rule set tailored to the user's assigned role. The rule set may define permitted actions for that user, such as reading data, viewing logs, editing configurations, or creating new connectors. The processor 102 may then apply the rule set to user interface elements, API endpoints, and background services by enabling or disabling specific interface components, filtering accessible datasets, or validating requested operations before execution. For example, the processor 102 may deny a request to edit schema mapping 140 parameters if the user's role lacks modification privileges, or hide administrative configuration tabs from users with view-only roles. In an embodiment, the processor 102 may also monitor contextual signals such as session state, user group membership, or system load to update or refine access control enforcement in real time. The processor 102 may log all access attempts and use these logs to audit policy compliance, trigger alerts, or refine future access policies based on observed patterns of use.

Still referring to FIG. 1, processor 102 is configured to configure the data connector 124 by binding, using the at least a processor 102, the data connector 124 to a web service protocol 148, registering, using the at least a processor 102, the data connector 124 to the internal system 116, and validating, using the at least a processor 102, the data connector 124 using at least a compliance protocol 150. As used in this disclosure, a "web service protocol" is information that defines a standardized set of rules and formats for communication between web-based systems. In an embodiment, the web service protocol 148 may allow two or more software components to exchange data or trigger operations over a network. The web service protocol 148 may define aspects such as message structure, endpoint discovery, transport methods, and invocation procedures. Without limitation, examples of web service protocols 148 may include the Hypertext Transfer Protocol, the Simple Object Access Protocol, the Web Services Description Language, and the Representational State Transfer protocol. These protocols may support stateless communication, request and response messaging, or remote procedure calls over a distributed system. As used in this disclosure, a "compliance protocol" is information that defines a set of requirements, checks, or verification rules used to ensure that a component adheres to operational, security, data integrity, or organizational compliance standards. In an embodiment, the component may include the data connector 124. The compliance protocol 150 may enforce constraints related to data formatting, authentication, encryption, access auditing, error reporting, or usage tracking. Without limitation, examples of compliance protocols 150 may include Health Insurance Portability and Accountability Act data handling checks, General Data Protection Regulation verification procedures, OAuth-based authorization validation, Secure Sockets Layer certificate validation workflows, and the like. In an embodiment, processor 102 may configure the data connector 124 by initiating a binding operation to a designated web service protocol 148. For example, the processor 102 may generate a resource descriptor using the Web Services Description Language, define endpoint URLs, and establish supported operations such as GET, POST, or PUT for communication with external data sources. Once the data connector 124 is bound to the selected web service protocol 148, the processor 102 may register the connector with the internal system 116 by storing metadata such as the connector identifier, supported schema types, usage scope, and role-based access parameters into an internal registry or configuration database. Following registration, the processor 102 may validate the data connector 124 using at least a compliance protocol 150. For example, the processor 102 may initiate an authorization flow using OAuth credentials, verify the structure 134 of transmitted data against pre-defined schema constraints, or confirm that encrypted data in transit complies with Transport Layer Security require-ments. If the compliance checks pass, the data connector 124 may be activated and made available for authorized internal users 146 based on the system's access control policy 142.

With continued reference to FIG. 1, the web service protocol 148 may include at least a Representational State Transfer (RESTful) Application Programming Interfaces (API) 152. As used in this disclosure, a "RESTful" web service protocol is a software architectural style that defines a set of constraints to be used when creating web services. RESTful systems are stateless and operate over HTTP, using standard HTTP methods such as GET, POST, PUT, and DELETE to perform operations on resources identified by URLs. Without limitation, a RESTful implementation may involve a client sending an HTTP GET request to retrieve a user profile, an HTTP POST request to submit a new form entry, or an HTTP DELETE request to remove a record from a database. The stateless nature of RESTful interactions enables scalability and simplicity in service design. The stateless nature of RESTful interactions may enable scal-ability and simplicity in service design because each client request may include all the necessary context for processing, without requiring the server to retain session information between requests. Without limitation, this may allow incom-ing requests to be handled independently, making it easier to distribute workloads across multiple servers. In an embodi-ment, such statelessness may support horizontal scaling, facilitate fault tolerance, and streamline system mainte-nance. This design may also reduce complexity in managing state, allowing developers to build modular, loosely coupled services that are easier to test, update, and deploy.

With continued reference to FIG. 1, as used in this disclosure, an "API" is an Application Programming Inter-face that defines a set of rules and protocols for how software components should interact with each other. With-out limitation, the API may expose specific endpoints, data formats, and supported operations, enabling external sys-tems or modules to request and exchange data. Without limitation, an API may allow a third-party analytics tool to access user data from an internal system 116 by issuing structured requests that conform to the specification of the API. In an embodiment, the API may follow the RESTful model, facilitating efficient, language-agnostic communica-tion between distributed services.

With continued reference to FIG. 1, the at least a com-pliance protocol 150 may include OAuth 2.0 154, wherein the OAuth 2.0 154 authorizes access to the external source 108 by issuing at least a token 156 to a requesting client 158 associated with the internal system 116, validating the at least a token 156 with an authorization server, and managing the at least a token 156 for continued access to an external system 160. As used in this disclosure, "OAuth 2.0" is an authorization framework that allows a system to grant limited access to its resources without sharing user creden-tials. OAuth 2.0 154 may operate by issuing a time-limited access token 156 to a client application after successful authentication, thereby enabling secure and delegated access. Without limitation, OAuth 2.0 154 may be used to permit an internal analytics tool to retrieve data from a third-party service without exposing the user's login infor-mation, and may support various grant types such as autho-rization code, client credentials, and refresh tokens 156 to accommodate different use cases. As used in this disclosure, an "authorization code" is a temporary credential issued by an authorization server to a requesting client 158 after the user successfully authenticates and grants access. The autho-rization code may be exchanged for an access token 156 in a follow-up request, which allows the client to access protected resources. Without limitation, this flow may be used when the client is a web application that needs to securely interact with an external API on behalf of an authenticated user without directly exposing the user's cre-dentials. As used in this disclosure, "client credentials" are an OAuth 2.0 grant type where a requesting client 158 obtains an access token 156 by directly authenticating with the authorization server using its own credentials, rather than acting on behalf of a specific user. The client credential approach may be appropriate for machine-to-machine com-munication or internal services accessing external APIs where no end-user interaction is required. Without limita-tion, a backend service may use the client credentials grant to periodically pull data from a third-party reporting service. As used in this disclosure, a "refresh token" is a credential issued by an authorization server that allows a requesting client 158 to obtain a new access token 156 after the original token 156 has expired, without requiring the user to re-authenticate. The refresh token 156 may be securely stored and used to maintain long-lived or continuous access in environments where sessions are expected to persist over time. Without limitation, a reporting dashboard may use a refresh token 156 to renew its access token 156 in the background, ensuring uninterrupted data retrieval from an external system 160.

With continued reference to FIG. 1, as used in this disclosure, a "token" is a digitally encoded piece of infor-mation issued by an authorization server that represents an authorization grant. The token 156 may be presented by a requesting client 158 to access protected resources on behalf of a user or system. Without limitation, the token 156 may contain a scope defining the level of access, an expiration timestamp, and a cryptographic signature to prevent tam-pering. As used in this disclosure, a "requesting client" is a computing component, software application, or service associated with the internal system 116 that initiates a request to access protected resources from an external source 108. The requesting client 158 may authenticate with an authorization server and receive an access token 156, which it then uses to access the desired resources. Without limitation, a requesting client 158 may include a data ingestion module, a reporting dashboard, or an internal API gateway. The requesting client 158 may include a backend microservice configured to synchronize records with a third-party platform. The requesting client 158 may be a mobile application that retrieves user-specific data from an external content management system. The requesting client 158 may include a cloud-based analytics engine that requests access to external telemetry feeds. The requesting client 158 may further include a serverless function configured to fetch authentication metadata from an external identity provider.

With continued reference to FIG. 1, as used in this disclosure, an "authorization server" is a component within the OAuth 2.0 154 framework responsible for authenticating the requesting client 158 and issuing access tokens 156. Without limitation, the authorization server may verify client credentials, determine access rights, and manage token 156 issuance and expiration. Without limitation, the authorization server may be a standalone service or part of a broader identity management system integrated with enterprise infrastructure. As used in this disclosure, an "external system" is a third-party or non-local computing environment, service, or application that maintains resources or data that may be accessed by the internal system 116 through authorized interactions. Without limitation, the external system 160 may be a cloud-based database, a partner platform, or an external API endpoint integrated through a data connector 124. Without limitation, an external system 160 may include a cloud-based database such as a managed SQL or NoSQL service hosted by a third-party provider, where structured or unstructured data may be stored and accessed over the internet. For example, the external system 160 may be a PostgreSQL database hosted on Amazon RDS or a document store hosted on MongoDB Atlas, accessible to internal systems 116 through secure API calls. An external system 160 may also include a partner platform, which may be a software environment operated by a business collaborator that shares data, services, or workflows with the internal system 116. For example, the partner platform may be a healthcare information exchange, a supply chain logistics interface, or a fintech portal providing real-time financial data to integrated clients. In an embodiment, the external system 160 may include an external API endpoint integrated through a data connector 124, which may represent any remote service or function accessible via a standardized interface such as RESTful APIs. Without limitation, this may include an endpoint that returns product inventory from an external vendor, transmits electronic health records from a hospital network, or provides authentication metadata from a federated identity service. The data connector 124 may manage the communication, schema reconciliation, and compliance protocols 150 necessary for secure and meaningful data exchange between the internal system 116 and the external system 160.

With continued reference to FIG. 1, the at least a processor 102 may be further configured to monitor real-time performance metrics 162 of the data connector 124, and update one or more operational parameters 164 of the data connector 124 as a function of the real-time performance metrics 162, wherein the real-time performance metrics 162 comprise data throughput 166. As used in this disclosure, "real-time performance metrics" are continuously or near-instantaneously updated measurements that reflect the current operational state or behavior of a system component. In an embodiment, the system component may include a data connector 124. As used in this disclosure, "continuously" is a manner of operation in which a system, process, or function is active without interruption over a given time period. A continuous process may involve ongoing monitoring, data collection, or execution without predefined intervals or manual triggers. Without limitation, a system may continuously track API call success rates, log incoming data events, or monitor the health of a data connector 124 during operation. As used in this disclosure, "near-instantaneously" is to actions or responses that occur with minimal delay following a triggering event, such that the delay is not perceptible or does not materially impact system performance. Without limitation, near-instantaneous feedback may involve the system adjusting operational parameters 164 immediately after detecting a performance threshold breach or issuing an alert within milliseconds of detecting a connectivity failure. In an embodiment, near-instantaneous behavior may support real-time responsiveness and adaptive system behavior. The real-time performance metrics 162 may be collected, analyzed, and acted upon as data is being processed, allowing dynamic adjustment and optimization. Without limitation, real-time performance metrics 162 may include data throughput 166, latency, error rates, request-response durations, resource utilization such as memory or CPU load, and the like. In an embodiment, real-time monitoring may allow the system to detect bottlenecks or abnormal patterns during active data exchange. As used in this disclosure, "operational parameters" are configurable or dynamically adjustable variables that govern the behavior or performance characteristics of a system component. In an embodiment, the operational parameters 164 may be altered based on internal logic, external input, observed metrics, and the like in order to maintain or improve system efficiency, stability, or compliance. Without limitation, the operational parameters 164 may include buffer size, polling interval, retry limits, concurrency settings, or timeout thresholds for a data connector 124. As used in this disclosure, "buffer size" is an operational parameter that defines the amount of memory allocated for temporarily storing data before it is processed or transmitted. Without limitation, adjusting the buffer size may influence system latency, throughput, and memory usage. Without limitation, a larger buffer size may improve throughput for high-volume data transfers, while a smaller buffer size may reduce memory overhead during low-bandwidth operations. As used in this disclosure, "polling interval" is an operational parameter that determines the frequency with which a data connector 124 queries or checks an external system 160 for new or updated data. The polling interval may be defined in milliseconds, seconds, or minutes, depending on the system's requirements. Without limitation, a shorter polling interval may enable near real-time data synchronization, while a longer interval may reduce network load or conserve resources. As used in this disclosure, "retry limits" are operational parameters that specify the maximum number of times a data connector 124 may attempt to resend a failed request or operation before giving up or reporting an error. Retry limits may help maintain service resilience without overwhelming external systems. Without limitation, a retry limit of three may allow for transient errors to be resolved without escalating to failure-handling logic. As used in this disclosure, "concurrency settings" are operational parameters that define how many parallel or simultaneous operations a data connector 124 may execute at a given time. These settings may affect performance, resource utilization, and error handling. Without limitation, increasing concurrency may speed up data ingestion from multiple sources, while reducing concurrency may help prevent overload on an external system 160 with limited capacity. As used in this disclosure, "timeout thresholds" are operational parameters that determine how long a data connector 124 should wait for a response from an external system 160 before treating the request as failed or unresponsive. Timeout thresholds may be set based on expected system behavior, network conditions, or service-level agreements. Without limitation, a timeout threshold of five seconds may be used to detect stalled API calls and allow for timely retries or fallback procedures. In an embodiment, the buffer size may be set to 64 megabytes to accommodate high-volume batch transfers from a cloud-based storage service, allowing the processor 102 to accumulate sufficient data before triggering a write operation to the internal system 116. In an embodiment, the polling interval may be configured to 15 seconds, enabling the data connector 124 to check an external telemetry feed for updates with minimal latency, while balancing network resource usage. In an embodiment, the retry limit may be set to five attempts, where the data connector 124 automatically retries failed HTTP requests to a partner API endpoint in the event of transient connectivity disruptions, before escalating the failure to a fault-handling routine. In an embodiment, the concurrency setting may allow up to 10 simultaneous data streams to be processed by the data connector 124, enabling efficient parallel retrieval of records from a distributed external system 160, such as a multi-region database cluster. In an embodiment, the timeout threshold may be set to 3,000 milliseconds, such that the data connector 124 aborts any external request that does not respond within this timeframe and logs the event for performance monitoring or adaptive adjustment of subsequent request intervals.

With continued reference to FIG. 1, as used in this disclosure, "data throughput" is the amount of data successfully transferred or processed by a system or component over a defined period of time. It may be expressed in units such as bytes per second or records per minute, and may be used to assess the efficiency or responsiveness of data transfer operations. Without limitation, data throughput 166 may reflect the volume of records transmitted between an external source 108 and an internal system 116, and may be used to adjust operational parameters 164 for optimal flow control and resource management. In an embodiment, if the processor 102 detects that data throughput 166 has dropped below a predefined threshold, such as falling from 100 megabytes per second to 30 megabytes per second, the processor 102 may respond by increasing the buffer size from 32 megabytes to 64 megabytes and extending the timeout threshold from 2,000 milliseconds to 5,000 milliseconds to accommodate increased latency in the external system 160. In an embodiment, if the processor 102 observes a spike in data throughput 166 due to a high-volume data sync, it may reduce the polling interval from 60 seconds to 15 seconds and increase the concurrency setting from 5 to 10 to accelerate data ingestion and reduce latency. These adjustments may be performed near-instantaneously based on continuously updated performance data collected during operation, ensuring sustained reliability and throughput efficiency of the data connector 124.

Still referring to FIG. 1, processor 102 is configured to deploy the data connector 124 to a service-based orchestration layer 168 of the internal system 116. As used in this disclosure, a "service-based orchestration layer" is a coordinated control framework within the internal system 116 that manages the deployment, execution, scaling, and interoperation of modular service components. In an embodiment, the modular service component may include the data connector 124. In an embodiment, the service-based orchestration layer 168 may abstract infrastructure complexities and enable dynamic management of services based on performance metrics, resource availability, or predefined rules. Without limitation, the service-based orchestration layer 168 may be implemented using a container orchestration platform such as Kubernetes, which may allow the data connector 124 to be deployed as a containerized microservice that can be monitored, restarted, or scaled independdently. In an embodiment, the service-based orchestration layer 168 may also handle dependency resolution, service discovery, fault tolerance, and load balancing to maintain consistent performance across the internal system 116. Without limitation, the service-based orchestration layer 168 may be implemented using platforms such as Kubernetes, Docker Swarm, Apache Mesos, and the like, which manage the lifecycle of containerized data connectors within a distributed infrastructure. In an embodiment, the data connector 124 may be deployed as a Docker container to a Kubernetes cluster, where the service-based orchestration layer 168 monitors its health using a liveness probe and automatically restarts the container if it fails to respond. In an embodiment, the service-based orchestration layer 168 may scale the data connector 124 horizontally across three nodes in response to an observed increase in data throughput 166, as detected by integrated monitoring tools such as Prometheus or Elastic Stack. In another embodiment, the service-based orchestration layer 168 may assign the data connector 124 to a specific namespace and pod within the internal system 116, ensuring network isolation and resource quota enforcement while allowing seamless interaction with other microservices through internal APIs. In an embodiment, the service-based orchestration layer 168 may include a serverless platform such as AWS Lambda or Google Cloud Run, where the data connector 124 is deployed as an event-triggered service that automatically spins up when new data is available and scales down when idle.

With continued reference to FIG. 1, the at least a processor 102 may be further configured to display, using a graphical user interface 170 of a downstream device 172, a status interface 174 of the data connector 124, wherein the status interface 174 comprising an error diagnostics representation 176. A "graphical user interface," as used herein, is a graphical form of user interface that allows users to interact with electronic devices. In some embodiments, GUI 170 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 170. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface 170 and an event handler may operate together to enable seamless interaction between the user and the apparatus 100. The GUI 170 serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI 170. For example, when a user clicks a button on the GUI 170 to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI 170 subsequently updates to reflect the system's responses, such as displaying output, modifying visual elements, or providing real-time feedback. Together, the GUI 170 and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data 120 in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device, and/or graphical user interface 170. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device 172 may include a data structure. As used in this disclosure, "data structure" is a way of organizing data represented in a specialized format on a computer configured such that the information can be effectively presented in a graphical user interface 170. In some cases, the data structure includes any input data 106. In some cases, the data structure contains data and/or rules used to visualize the graphical elements within a graphical user interface 170. In some cases, the data structure may include any data described in this disclosure. In some cases, the data structure may be configured to modify the graphical user interface 170, wherein data within the data structure may be represented visually by the graphical user interface 170. In some cases, the data structure may be continuously modified and/or updated by processor 102, wherein elements within graphical user interface 170 may be modified as a result. In some cases, processor 102 may be configured to transmit display device and or the downstream device 172 the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio, and microwave data and/or signals, combinations thereof, and the like, among others. Processor 102 may transmit the data described above to a database wherein the data may be accessed from the database. Processor 102 may further transmit the data above to a display device, client device, or another computing device. The data structure may serve as the organizational framework that stores, retrieves, and manages data required for processing events and updating the GUI 170. The data structure may act as a bridge between the user's input, captured by the event handler, and the output displayed on the GUI 170, ensuring that information is handled efficiently and accurately throughout the interaction. For example, without limitation, when a user interacts with a dropdown menu in the GUI 170 to select a topic, the event handler may capture this input and accesses a data structure. The data structure may retrieve the relevant information such as, text explanations, videos, or interactive exercises, and passes it back to the event handler, which may then trigger the appropriate updates to the GUI 170. In another embodiment, the data structure may also maintain the state of the system, tracking user progress, preferences, and session history. For instance, without limitation, a hash table may store user specific configurations which the event handler references when processing interactions. The GUI 170 may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface 170 (GUI) that allows users to perform actions, provide input, or engage with the apparatus 100. Interactive elements may be designed to facilitate two-way communication between the user and the system, enabling the user to influence the behavior of the apparatus 100 or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs.

With continued reference to FIG. 1, as used in this disclosure, "downstream device" is a device that accesses and interacts with apparatus 100. For instance, and without limitation, downstream device 172 may include a remote device and/or apparatus 100. In a non-limiting embodiment, downstream device 172 may be consistent with a computing device as described in the entirety of this disclosure. Without limitation, the downstream device 172 may include a display device. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user interface 170 to a user, wherein a user may interact with a GUI 170. In some cases, a user may view a GUI 170 through display. Additionally, or alternatively, processor 102 be connected to display device. In one or more embodiments, transmitting the status interface 174 may include displaying the status interface 174 at display device using a visual interface.

With continued reference to FIG. 1, as used in this disclosure, a "status interface" is a visual representation generated by the processor 102 and displayed on a downstream device 172 to communicate the operational state, performance indicators, and health metrics of a system component. In an embodiment, the system component may include the data connector 124. The status interface 174 may provide real-time or near-instantaneous visibility into various aspects of the function of the data connector 124. Without limitation, the status interface 174 may display elements such as connection status such as active, idle, failed, data throughput rates, polling intervals, retry activity, error logs, and the like. In an embodiment, the status interface 174 may be presented on a dashboard within a web-based control panel. It may feature color-coded icons or indicators like green for active, red for failure, performance graphs showing throughput over time, collapsible sections for advanced configuration or logs, and the like. The status interface 174 may allow user interaction, such as filtering by connector ID, exporting logs, or manually restarting a failed data connector 124. As used in this disclosure, an "error diagnostics representation" is a component of the status interface 174 that visually or textually conveys information about errors, anomalies, or faults detected in the operation of the data connector 124. The error diagnostics representation 176 may include error codes, timestamps, descriptions, affected system components, recommended remediation actions, and the like. Without limitation, the error diagnostics representation 176 may be displayed as a table of recent errors, an alert panel with warning messages, an interactive timeline showing when failures occurred and were resolved, and the like. In an embodiment, the inclusion of the error diagnostics representation 176 may enable real-time visibility into faults that may impair the functionality, performance, or reliability of the data connector 124. Continuing, this may allow technical personnel or automated management routines to respond rapidly, diagnose root causes, and restore normal operation, thereby minimizing data loss, reducing downtime, and supporting compliance with service-level objectives. In an embodiment, this feature may further support audit trails, facilitate debugging, and improve the maintainability of the internal system 116.

With continued reference to FIG. 1, the at least a processor 102 may be further configured to isolate the data connector 124 within a containerized environment 178 and deploy the data connector 124 across one or more distributed nodes 180. As used in this disclosure, a "containerized environment" is a virtualized computing environment in which software components are encapsulated within isolated execution units known as containers. In an embodiment, the software component may include the data connector 124. Without limitation, the containerized environment 178 may include the application code, system libraries, and runtime dependencies necessary to run the component, ensuring consistency and portability across different computing infrastructures. Without limitation, the containerized environment 178 may be managed by orchestration tools such as Kubernetes or Docker, allowing for controlled deployment, scaling, and lifecycle management of the containerized data connector 124. Without limitation, the containerized environment 178 may include a Kubernetes cluster in which the data connector 124 is deployed as a pod that contains its dependencies and runtime logic. The pod may run in isolation, ensuring that changes or faults in one container do not affect others. In an embodiment, the container may include the executable code of the data connector 124, authentication modules, configuration files, and logging tools. As used in this disclosure, "distributed nodes" are individual computing units, each operating as part of a larger, interconnected system that collectively processes data, executes tasks, or hosts services. The distributed nodes 180 may reside across physical machines, virtual machines, or cloud-based instances, and may be organized in a cluster or grid to achieve redundancy, load distribution, and high availability. Without limitation, the distributed node may execute a specific instance of a containerized service, share workload with other nodes, or provide failover support. In an embodiment, the data connector 124 may be deployed across three distributed nodes 180 within a cloud infrastructure, such as three virtual machines in different availability zones of a cloud provider like AWS, Azure, or Google Cloud. Each node may host a separate instance of the data connector 124, with the orchestration layer managing load balancing and failover among them. Without limitation, this configuration may allow the processor 102 to isolate the data connector 124 within its own containerized environment 178, ensuring that it operates independently from other system components. The isolation may enhance security by limiting the access of the data connector 124 to only its authorized resources and by preventing unauthorized interaction with other services. In an embodiment, if a vulnerability is discovered within the data connector 124, containment within the containerized environment 178 may prevent it from compromising the broader system. Continuing, the configuration may support fault tolerance, allowing the system to recover from unexpected disruptions. Without limitation, if one distributed node hosting the data connector 124 fails due to hardware malfunction, network interruption, or overload, the orchestration layer may automatically redirect traffic to another healthy node where a duplicate instance of the data connector 124 is running, thereby preserving data flow and system uptime. Additionally and/or alternatively, the isolated and distributed deployment may improve resource management by enabling dynamic allocation of CPU, memory, and storage to each container based on real-time demand. Without limitation, the orchestration system may throttle resource usage of the data connector 124 during low traffic periods or allocate additional resources during peak activity. From a scalability and performance perspective, distributing the data connector 124 across multiple nodes may allow the internal system 116 to process higher volumes of data without degradation. In an embodiment, if the input data 106 throughput increases beyond a predefined threshold, the orchestration layer may provision new nodes and instantiate additional containerized instances of the data connector 124 to share the load, maintaining low latency and responsiveness across the system. Continuing this distributed, containerized architecture may also enhance availability, ensuring that the data connector 124 remains operational even during maintenance, updates, or partial system outages. Without limitation, rolling updates may be applied to individual containers without interrupting service, and traffic may be routed to healthy nodes while others are being patched or restarted.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
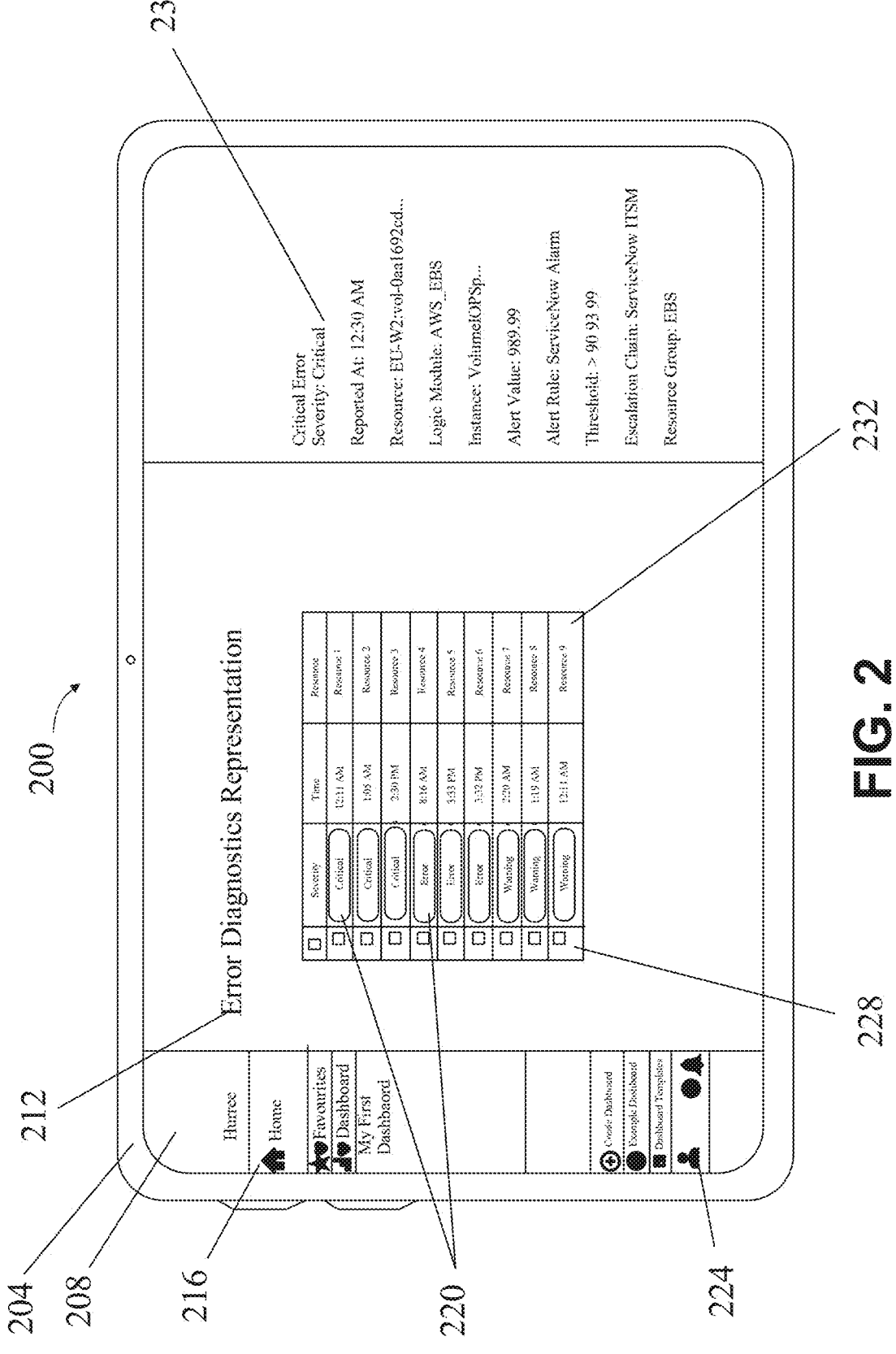
FIG. 2 is an exemplary illustration of a graphical user interface.

Referring now to FIG. 2, an exemplary illustration 200 of a graphical user interface. In an embodiment, the illustration 200 may include a downstream device 204. In an embodiment, the downstream device 204 may be a web-enabled terminal, tablet, desktop computer, mobile device, or embedded interface operable to present a user interface.

Without limitation, the downstream device 204 may execute browser-based or native applications that enable users to monitor, configure, or interact with data connectors or system outputs. In an embodiment, the downstream device may display a graphical user interface 208. In an embodiment, the graphical user interface 208 may include icons, buttons, data visualizations, input fields, and layout panels designed to reflect the status of data connector operations or system performance. Without limitation, the graphical user interface 208 may be web-based and dynamically rendered using HTML, CSS, and JavaScript libraries. In an embodiment, the graphical user interface 208 may include an error diagnostic representation dashboard 212. As used in this disclosure, "error diagnostic representation dashboard" is a graphical module within the user interface that visually represents error states, performance anomalies, or validation failures associated with the operation of the system. In an embodiment, the error diagnostic representation dashboard 212 may include color-coded alerts, error logs, connector-specific messages, or tooltips identifying the cause and suggested resolution for data ingestion failures. Without limitation, the error diagnostic representation dashboard 212 may display a list of failed data connectors, the timestamp of each failure, and contextual metadata indicating protocol or schema mismatches. In an embodiment, the graphical user interface 208 may include a home icon 216. As used in this disclosure, "home icon" is an interactive visual symbol included in the graphical user interface that, when selected, redirects the user to a primary or default landing screen. In an embodiment, the home icon 216 may be represented by a stylized house symbol and may reset the interface state or reload a summary view. Without limitation, activating the home icon 216 may return the user to a dashboard showing a list of active connectors, overall system health, or recently ingested records. In an embodiment, the graphical user interface 208 may include a table visualization 220. As used in this disclosure, "table visualization" is a structured layout rendered within the graphical user interface that displays data in rows and columns for ease of review, comparison, and interaction. In an embodiment, the table visualization 220 may display information such as connector names, statuses, associated schemas, API endpoints, or throughput metrics. Without limitation, each row of the table 220 may represent an individual data connector, and columns may include status icons, timestamps, and available user actions. In an embodiment, the graphical user interface 208 may include a profile icon 224. As used in this disclosure, "profile icon" is a graphical element within the user interface that provides access to user-specific settings, account information, or role-based permissions. In an embodiment, the profile icon 224 may appear as an avatar or user silhouette and may launch a dropdown menu or modal window when clicked. Without limitation, the profile icon 224 may allow users to change passwords, view access history, or manage authentication tokens. In an embodiment, the graphical user interface 208 may include an interactive element 228. The interactive element 228 may include checkboxes associated with the table visualization 220. As used in this disclosure, "interactive element" is a graphical control within the user interface designed to allow direct user manipulation or input. In an embodiment, the interactive element may include checkboxes, toggles, dropdown menus, or input fields. Without limitation, the interactive element may include checkboxes next to each row of the table visualization, enabling the user to select multiple connectors for batch actions such as revalidation, deletion, or export. In an embodiment, the graphical user interface 208 may include a resource column 232. The resource column 232 may be part of the table visualization 220. As used in this disclosure, "resource column" is a designated vertical segment within the table visualization that displays identifiers or labels associated with system resources or components. In an embodiment, the resource column 232 may include labels identifying the external source, internal system target, or service name linked to each connector. Without limitation, the resource column 232 may help the user quickly associate connector entries with business units, environments (e.g., staging or production), or protocol types. In an embodiment, the graphical user interface 208 may include a summary panel 236. As used in this disclosure, "summary panel" is a visual module within the graphical user interface that presents a condensed overview of relevant metrics, statuses, or activity associated with system performance or connector operation. In an embodiment, the summary panel 236 may display total active connectors, error counts, data throughput rates, and most recent schema updates. Without limitation, the summary panel 236 may allow executives or administrators to assess high-level operational trends without navigating through detailed views.

Figure 3:
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, the input data may include source parameters such as field names, data types, nested object structures, and record samples from an external source schema, as well as corresponding metadata from the internal system schema. The output data may include one or more predicted schema mappings between the external and internal schemas, entity classifications for individual fields (e.g., "customer_email," "event_timestamp"), or transformation rules used to normalize formats, rename fields, or align enumerated values. In an embodiment, the training data may include historical examples of successfully configured data connectors, where the machine learning model learns to generalize field-level relationships and predict semantic equivalence based on structural and contextual features of the schemas being integrated.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a schema archetype, such as a sub-population of third-party platforms that structure customer data according to similar field labels, formatting conventions, or entity groupings. In an embodiment, the classifier may group training data corresponding to CRM systems that define contact fields as flat key-value pairs, thereby allowing the system to apply model weights specifically optimized for that archetype when mapping or validating new external schemas.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include schema fragments, field names, data types, value samples, and associated metadata from external sources as inputs, and may include normalized field labels, target schema field identifiers, entity classifications, and transformation directives as outputs. In an embodiment, the input examples may represent raw records from third-party APIs such as Salesforce or HubSpot, while the output examples may reflect how those records were previously mapped to internal data models, including renamed fields, standardized formats, and resolved semantic equivalencies, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
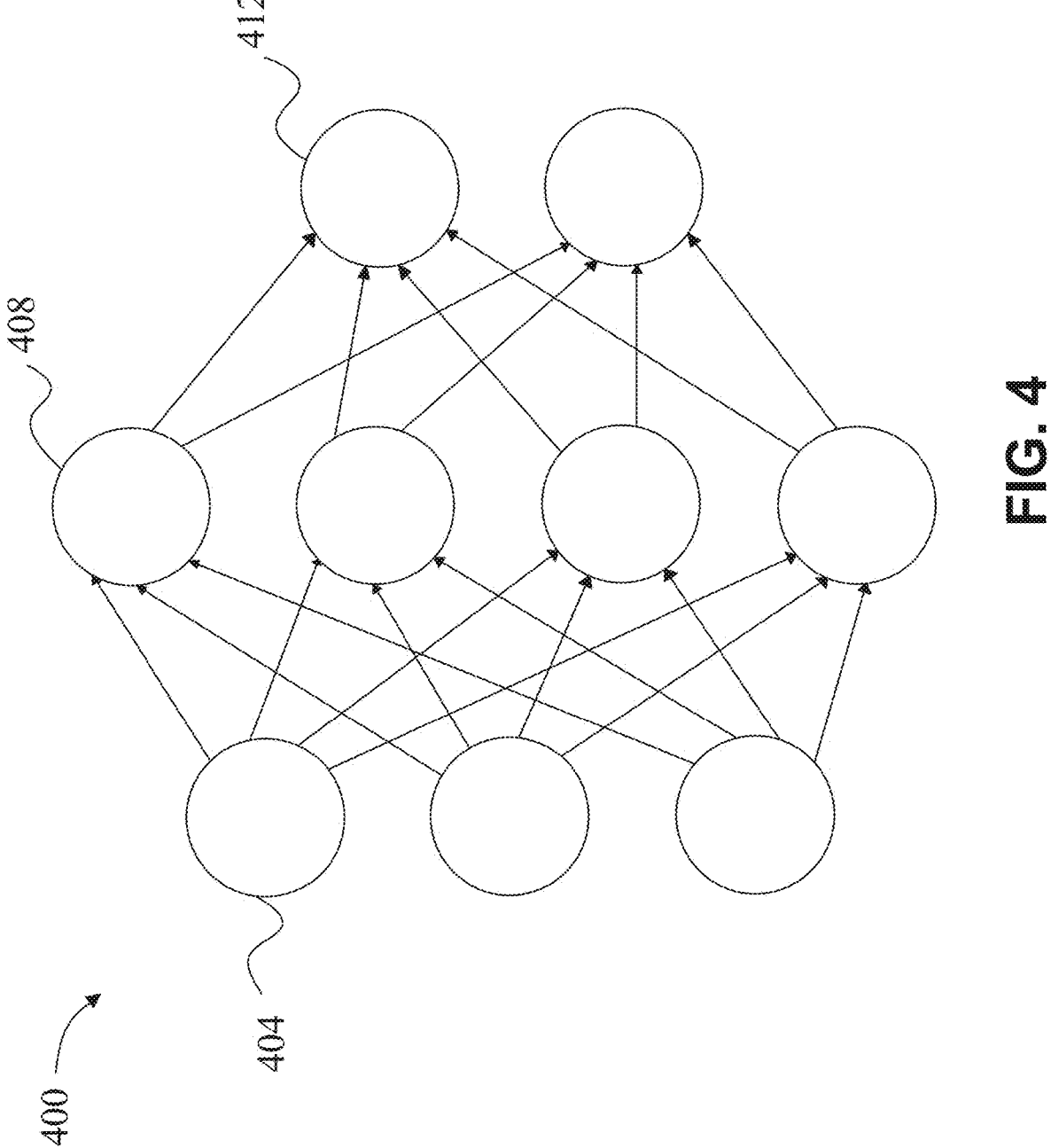
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
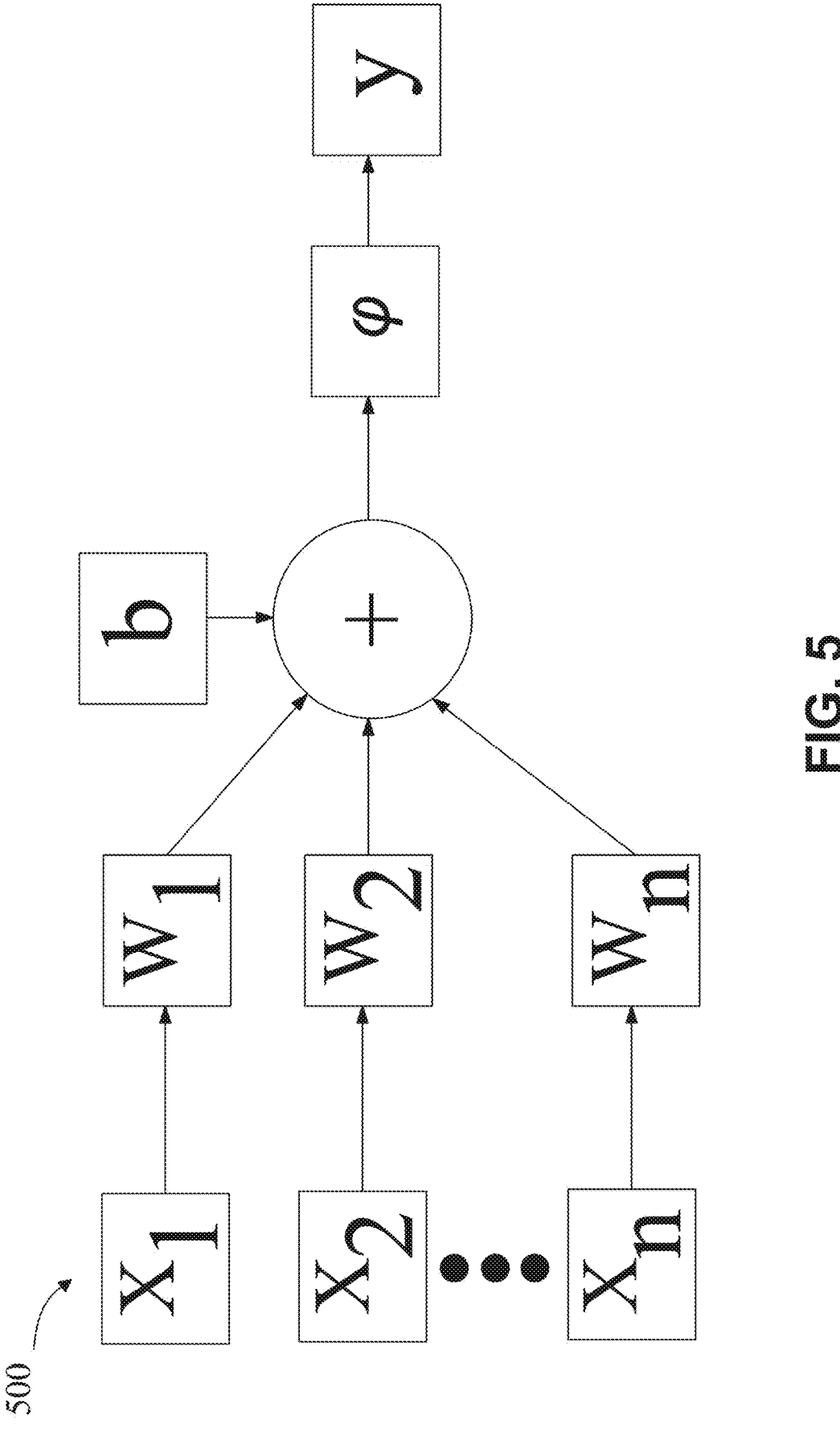
FIG. 5 is a diagram of an exemplary embodiment of a node of a neural network.

Referring now to FIG. 5, an exemplary embodiment of a node 500 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^{-x} - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}.$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $f(x) = a(1 + \tanh(\sqrt{2/\pi}(x + bx^r)))$ for some values of a, b, and r, and/or a scaled exponential linear unit function such as $$f(x) = \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
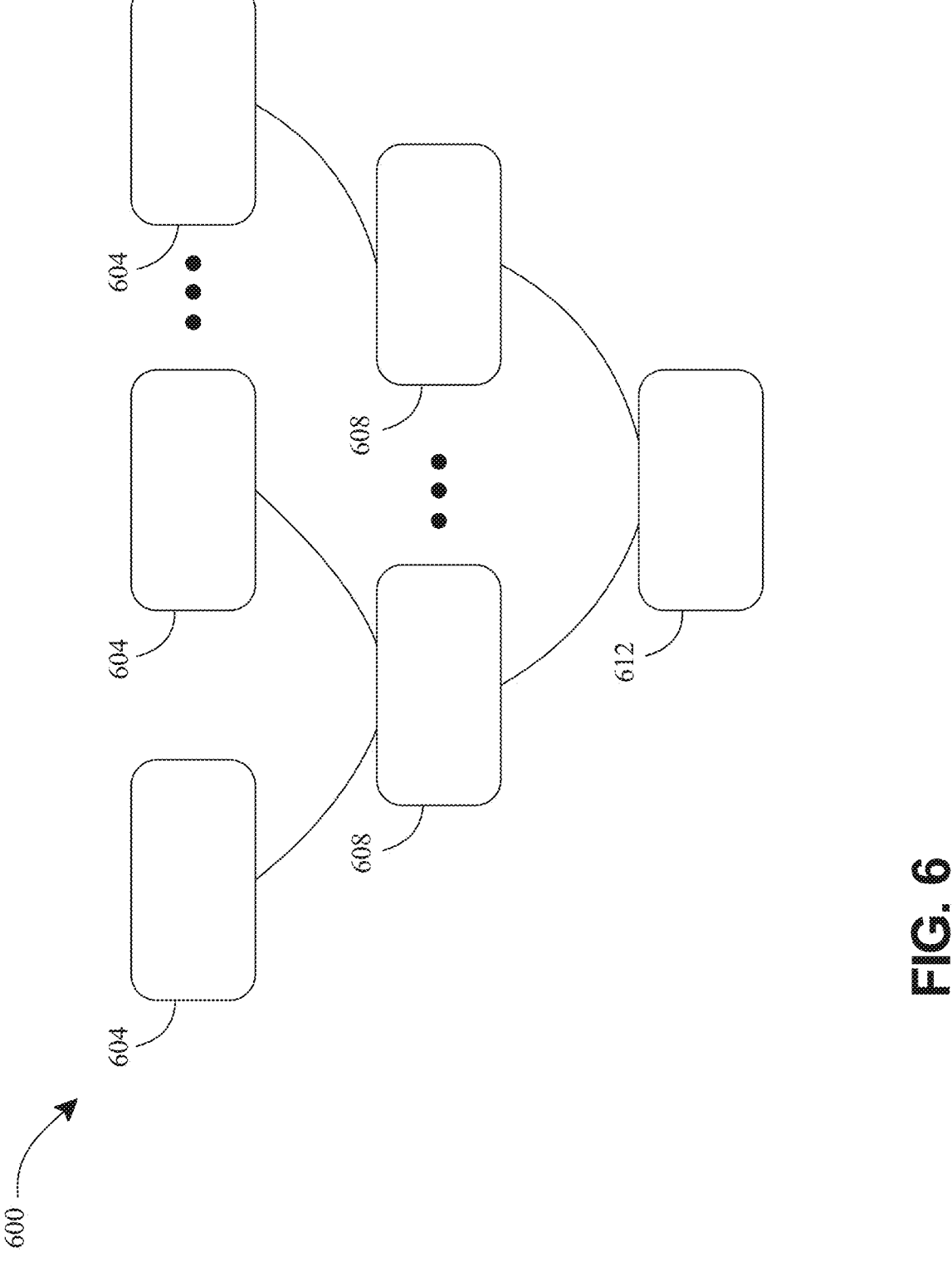
FIG. 6 is a diagram of an exemplary embodiment of a cryptographic accumulator.

Referring now to FIG. 6, an exemplary embodiment of a cryptographic accumulator 600 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 600 has a plurality of accumulated elements 604, each accumulated element 604 generated from a lot of the plurality of data lots. Accumulated elements 604 are create using an encryption process, defined for this purpose as a process that renders the lots of data unintelligible from the accumulated elements 604; this may be a one-way process such as a cryptographic hashing process and/or a reversible process such as encryption. Cryptographic accumulator 600 further includes structures and/or processes for conversion of accumulated elements 604 to root 612 element. For instance, and as illustrated for exemplary purposes in FIG. 6 cryptographic accumulator 600 may be implemented as a Merkle tree and/or hash tree, in which each accumulated element 604 created by cryptographically hashing a lot of data. Two or more accumulated elements 604 may be hashed together in a further cryptographic hashing process to produce a node 608 element; a plurality of node 608 elements may be hashed together to form parent nodes 608, and ultimately a set of nodes 608 may be combined and cryptographically hashed to form root 612. Contents of root 612 may thus be determined by contents of nodes 608 used to generate root 612, and consequently by contents of accumulated elements 604, which are determined by contents of lots used to generate accumulated elements 604. As a result of collision resistance and avalanche effects of hashing algorithms, any change in any lot, accumulated element 604, and/or node 608 is virtually certain to cause a change in root 612; thus, it may be computationally infeasible to modify any element of Merkle and/or hash tree without the modification being detectable as generating a different root 612. In an embodiment, any accumulated element 604 and/or all intervening nodes 608 between accumulated element 604 and root 612 may be made available without revealing anything about a lot of data used to generate accumulated element 604; lot of data may be kept secret and/or demonstrated with a secure proof as described below, preventing any unauthorized party from acquiring data in lot.

Alternatively or additionally, and still referring to FIG. 6, cryptographic accumulator 600 may include a "vector commitment" which may act as an accumulator in which an order of elements in set is preserved in its root 612 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 600 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Referring now to FIG. 7, a flow diagram of an exemplary method 700 for generating at least a data connector is illustrated. At step 705, method 700 includes receiving, using at least a processor, input data from an external source, wherein the input data comprises a plurality of source parameters. This may be implemented as described and with reference to FIGS. 1-6.

Still referring to FIG. 7, at step 710, method 700 includes identifying, using the at least a processor, a first data schema associated with the external source and a second data schema associated with an internal system. In an embodiment, the at least a processor may be further configured to encrypt, using one or more cryptographic protocols, data transmitted between the internal system and the external source. This may be implemented as described and with reference to FIGS. 1-6.

Still referring to FIG. 7, at step 715, method 700 includes instantiating, using the at least a processor, a runtime instance of a data connector associated with the external source as a function of the first data schema and the second data schema. In an embodiment, the at least a processor may be further configured to instantiate one or more machine learning models associated with the data connector, wherein the one or more machine learning models are configured to detect at least a schema of the input data and identify one or more entities of the input data. In an embodiment, the at least a processor may be further configured to determine, using a decision tree of the one or more machine learning models, a structure and associated semantics of the first data schema by identifying one or more features of the input data and generate, using the at least a processor, a schema mapping between the first data schema and the second data schema of the internal system based on the structure and the associated semantics. In an embodiment, the at least a processor may be further configured to generate an access control policy for the data connector based on role-based permissions of one or more internal users. This may be implemented as described and with reference to FIGS. 1-6.

Still referring to FIG. 7, at step 720, method 700 includes configuring, using the at least a processor, the data connector by binding, using the at least a processor, the data connector to a web service protocol, registering, using the at least a processor, the data connector to the internal system, and validating, using the at least a processor, the data connector using at least a compliance protocol. In an embodiment, the web service protocol may include at least a Representational State Transfer (RESTful) Application Programming Interfaces (API). In an embodiment, the at least a compliance protocol may include OAuth 2.0, wherein the OAuth 2.0 authorizes access to the external source by issuing at least a token to a requesting client associated with the internal system, validating the at least a token with an authorization server, and managing the at least a token for continued access to an external system. In an embodiment, the at least a processor may be further configured to monitor real-time performance metrics of the data connector, and update one or more operational parameters of the data connector as a function of the real-time performance metrics, wherein the real-time performance metrics comprise data throughput. This may be implemented as described and with reference to FIGS. 1-6.

Still referring to FIG. 7, at step 725, method 700 includes deploying, using the at least a processor, the data connector to a service-based orchestration layer of the internal system. In an embodiment, the at least a processor may be further configured to display, using a graphical user interface of a downstream device, a status interface of the data connector, wherein the status interface comprising an error diagnostics representation. In an embodiment, the at least a processor may be further configured to isolate the data connector within a containerized environment and deploy the data connector across one or more distributed nodes. This may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
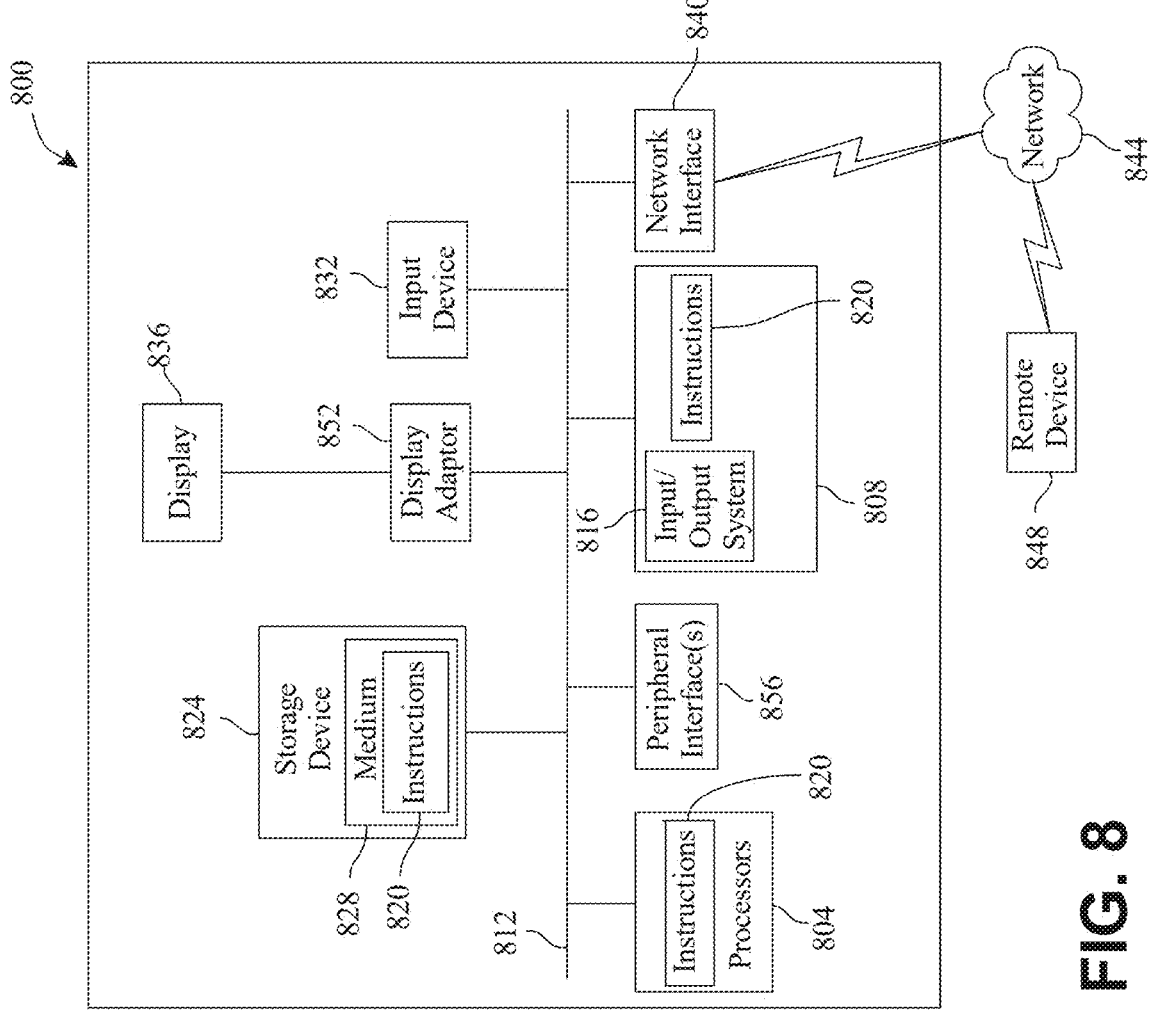
FIG. 8 is a block diagram of a computing system that can be used to implement any one or more of the methodologies disclosed herein and any one or more portions thereof.

FIG. 8 shows a diagrammatic representation of one embodiment of computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device (e.g., a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating at least a data connector, wherein the apparatus comprises: at least a computing device, wherein the computing device comprises: a memory; and at least a processor communicatively connected to the memory, wherein the memory contains instructions configuring the at least a processor to: receive, using the at least a processor, input data from an external source, wherein the input data comprises a plurality of source parameters; identify, using the at least a processor, a first data schema associated with the external source and a second data schema associated with an internal system; instantiate, using the at least a processor, a runtime instance of a data connector associated with the external source as a function of the first data schema and the second data schema; configure, using the at least a processor, the data connector by: binding, using the at least a processor, the data connector to a web service protocol; registering, using the at least a processor, the data connector to the internal system; and validating, using the at least a processor, the data connector using at least a compliance protocol which comprises open authorization (OAuth) 2.0, wherein the OAuth 2.0 authorizes access to the external source by: issuing at least a token to a requesting client associated with the internal system; validating the at least a token with an authorization server; and managing the at least a token for continued access to an external system; and deploy, using the at least a processor, the data connector to a service-based orchestration layer of the internal system.

2. The apparatus of claim 1, wherein the at least a processor is further configured to:
   instantiate one or more machine learning models associated with the data connector, wherein the one or more machine learning models are configured to:
   detect at least a schema of the input data; and
   identify one or more entities of the input data.

3. The apparatus of claim 2, wherein the at least a processor is further configured to:
   determine, using a decision tree of the one or more machine learning models, a structure and associated semantics of the first data schema by identifying one or more features of the input data; and
   generate, using the at least a processor, a schema mapping between the first data schema and the second data schema of the internal system based on the structure and the associated semantics.

4. The apparatus of claim 1, wherein the at least a processor is further configured to encrypt, using one or more cryptographic protocols, data transmitted between the internal system and the external source.

5. The apparatus of claim 1, wherein the at least a processor is further configured to display, using a graphical user interface of a downstream device, a status interface of the data connector, wherein the status interface comprising an error diagnostics representation.

6. The apparatus of claim 1, wherein the at least a processor is further configured to monitor real-time performance metrics of the data connector, and update one or more operational parameters of the data connector as a function of the real-time performance metrics, wherein the real-time performance metrics comprise data throughput.

7. The apparatus of claim 1, wherein the at least a processor is further configured to generate an access control policy for the data connector based on role-based permissions of one or more internal users.

8. The apparatus of claim 1, wherein the web service protocol comprises at least a Representational State Transfer (RESTful) Application Programming Interfaces (API).

9. The apparatus of claim 1, wherein the at least a processor is further configured to:
   isolate the data connector within a containerized environment; and
   deploy the data connector across one or more distributed nodes.

10. A method for generating at least a data connector, wherein the method comprising: receiving, using at least a processor, input data from an external source, wherein the input data comprises a plurality of source parameters; identifying, using the at least a processor, a first data schema associated with the external source and a second data schema associated with an internal system; instantiating, using the at least a processor, a runtime instance of a data connector associated with the external source as a function of the first data schema and the second data schema; configuring, using the at least a processor, the data connector by: binding, using the at least a processor, the data connector to a web service protocol; registering, using the at least a processor, the data connector to the internal system; and validating, using the at least a processor, the data connector using at least a compliance protocol which comprises open authorization (OAuth) 2.0, wherein the OAuth 2.0 authorizes access to the external source by: issuing at least a token to a requesting client associated with the internal system; validating the at least a token with an authorization server; and managing the at least a token for continued access to an external system; and deploying, using the at least a processor, the data connector to a service-based orchestration layer of the internal system.

11. The method of claim 10, further comprising:
   instantiating, using the at least a processor, one or more machine learning models associated with the data connector, wherein the one or more machine learning models are configured to:
   detect at least a schema of the input data; and
   identify one or more entities of the input data.

12. The method of claim 11, further comprising:
   determining, using a decision tree of the one or more machine learning models, a structure and associated semantics of the first data schema by identifying one or more features of the input data; and
   generating, using the at least a processor, a schema mapping between the first data schema and the second data schema of the internal system based on the structure and the associated semantics.

13. The method of claim 10, further comprising encrypting, using one or more cryptographic protocols, data transmitted between the internal system and the external source.

14. The method of claim 10, further comprising displaying, using a graphical user interface of a downstream device, a status interface of the data connector, wherein the status interface comprising an error diagnostics representation.

15. The method of claim 10, further comprising monitoring, using the at least a processor, real-time performance metrics of the data connector, and update one or more operational parameters of the data connector as a function of the real-time performance metrics, wherein the real-time performance metrics comprise data throughput.

16. The method of claim 10, further comprising generating, using the at least a processor, an access control policy for the data connector based on role-based permissions of one or more internal users.

17. The method of claim 10, further comprising binding, using the at least a processor, the data connector to at least a Representational State Transfer (RESTful) Application Programming Interfaces (API) of the web service protocol.

18. The method of claim 10, further comprising:

isolating, using the at least a processor, the data connector within a containerized environment; and deploying, using the at least a processor, the data connector across one or more distributed nodes.

* * * * *